United States Patent [19]

Zeidler

[11] 4,207,972
[45] Jun. 17, 1980

[54] AUTOMATIC WEAR COMPENSATOR FOR BELLEVILLE SPRING CLUTCHES

[75] Inventor: Reinhold C. Zeidler, Birmingham, Mich.

[73] Assignee: Borg-Warner Corporation, Chicago, Ill.

[21] Appl. No.: 909,756

[22] Filed: May 26, 1978

[51] Int. Cl.² .............................................. F16D 13/75
[52] U.S. Cl. ........................... 192/111 A; 188/79.5 SS
[58] Field of Search ............. 192/111 A, 111 R, 70.25, 192/70.23; 188/71.8, 79.5 SS, 79.5

[56] References Cited

U.S. PATENT DOCUMENTS

| | | | |
|---|---|---|---|
| 1,100,048 | 6/1914 | Beck | 192/111 R |
| 1,131,769 | 3/1915 | Borg | 192/111 R |
| 1,132,903 | 3/1915 | Beck | 192/111 R |
| 1,455,587 | 5/1923 | Hamilton | 192/111 R |
| 1,594,161 | 7/1926 | Evans | 192/111 R |
| 2,241,223 | 5/1941 | Spase et al. | 192/111 A |
| 2,703,164 | 3/1955 | Binder | 192/111 A |
| 3,613,849 | 10/1971 | Pape | 192/111 A |
| 3,702,651 | 11/1972 | Fujita et al. | 192/111 A |
| 3,797,622 | 3/1974 | Worner | 192/111 A |
| 3,858,700 | 1/1975 | Kirschling | 192/111 A |
| 3,938,636 | 2/1976 | Nerska | 192/111 A |
| 4,142,610 | 3/1979 | Alexander et al. | 192/111 A |

*Primary Examiner*—George H. Krizmanich
*Attorney, Agent, or Firm*—James A. Geppert

[57] ABSTRACT

An automatic wear compensator for a vehicle clutch actuated by a diaphragm or Belleville spring to compensate for the normal wear of the clutch friction faces during use and maintain the initial load characteristics of the spring throughout the life of the linings. The adjustment is accomplished through a rotatable pivot ring operatively connected to the pressure plate and adjusted through a series of camming surfaces, thus retaining the fulcrum surface for the spring on the pressure plate at a substantially constant position in the clutch assembly and maintaining the installed position of the diaphragm spring. Also, a self-adjusting stop is provided for the pressure plate to limit retraction thereof and allow adjustment of the pivot ring.

21 Claims, 9 Drawing Figures

AUTOMATIC WEAR COMPENSATOR FOR BELLEVILLE SPRING CLUTCHES

BACKGROUND OF THE INVENTION

Vehicle clutches of the diaphragm spring type typically include a flywheel connected to a driving shaft from the vehicle engine, a clutch disc splined onto a driven shaft leading to the vehicle transmission, an axially movable annular pressure plate rotatable with the flywheel and having a fulcrum surface on the plate surface opposite to the clutch disc, a clutch cover secured to the flywheel, a diaphragm or Belleville spring engaging the fulcrum surface of the pressure plate and a separate fulcrum on the cover, and a release bearing axially reciprocable on the driven shaft when actuated by the vehicle operator to engage radially inwardly extending fingers of the diaphragm spring. During actuation of the diaphragm spring by the release bearing to advance or retract the pressure plate, the spring pivots about wire pivot rings mounted on the clutch cover with the peripheral portion of the spring engaging the fulcrum surface of the pressure plate. Upon release and re-engagement of the clutch assembly, all of the parts will resume the same relationship.

As wear occurs to the clutch friction facings, the pressure plate moves a greater distance toward the flywheel to engage the clutch disc, with the result that the diaphragm spring moves through a greater arc of travel for complete clutch engagement. This change in pressure plate position reduces the clearance between the spring fingers and the release bearing and the free travel at the clutch pedal. If the car is not serviced in time and the free travel reestablished, the fingers may ride the bearing causing clutch slippage. To alleviate this problem, the vehicle operator must have the clutch serviced to reposition the release bearing. A large percentage of clutch failures in passenger cars have been due to neglect in maintaining proper adjustment of the clutch system.

To overcome this problem, various methods of automatic adjustment were attempted either through adjustment of the release bearing carrier or by adjusting the fulcrum surface of the pressure plate. The present invention relates to an improved adjustment device obviating previously known problems.

SUMMARY OF THE INVENTION

The present invention relates to the provision of an automatic wear compensator in a vehicle friction clutch of the diaphragm spring type where adjustment occurs in the pressure plate assembly of the clutch. The adjustment device includes a fulcrum or pivot ring which is caused to rotate upon the release of pressure thereon by the diaphragm spring; the pivot ring being constantly biased in one direction of rotation by a series of tension springs connected between it and the pressure plate. A series of complementary camming ramps are formed on the pressure plate and pivot ring so as to adjust the distance between the clutch disc engaging surface of the pressure plate and the fulcrum surface of the pivot ring as the clutch friction facings wear.

The present invention also comprehends the provision of a clutch automatic wear compensator having a self-adjusting stop for the pressure plate so as to preserve a constant clearance resulting in clean release of the clutch disc upon retraction of the pressure plate. In one form, the stop includes a collar having a slip fit on an elongated pin secured at one end in the pressure plate; the collar being mounted in a clearance opening in the clutch cover. A one-way clutch arrangement provides relative movement in one direction between the elongated pin and the stop collar. In another form, the stop consists of a plain pin slidable in the pressure plate and engaged by a one-way clutch with the pin operating between the surface of the flywheel and the flange of the clutch cover.

The present invention further comprehends the provision of an automatic clutch wear compensator that maintains the original load characteristics of the diaphragm spring.

The present invention also provides an automatic wear compensator for a vehicle friction clutch utilizing a pivot ring rotatably mounted on the pressure plate and biased by tension springs connected therebetween. A plurality of leaf springs act as pawls engaging the pivot ring at a series of teeth formed on the inner periphery of the pivot ring to prevent counter-rotation thereof.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view taken on the irregular line 2—2 of FIG. 1.

FIG. 7 is a side elevational view of cooperating cam ramps taken on the line 7—7 of FIG. 1.

FIG. 8 is a cross sectional view of an alternate embodiment of self-adjusting stop for the pressure plate.

FIG. 9 is a cross sectional view of a third form of self-adjusting stop.

Description of the Preferred Embodiments

Figure 1:
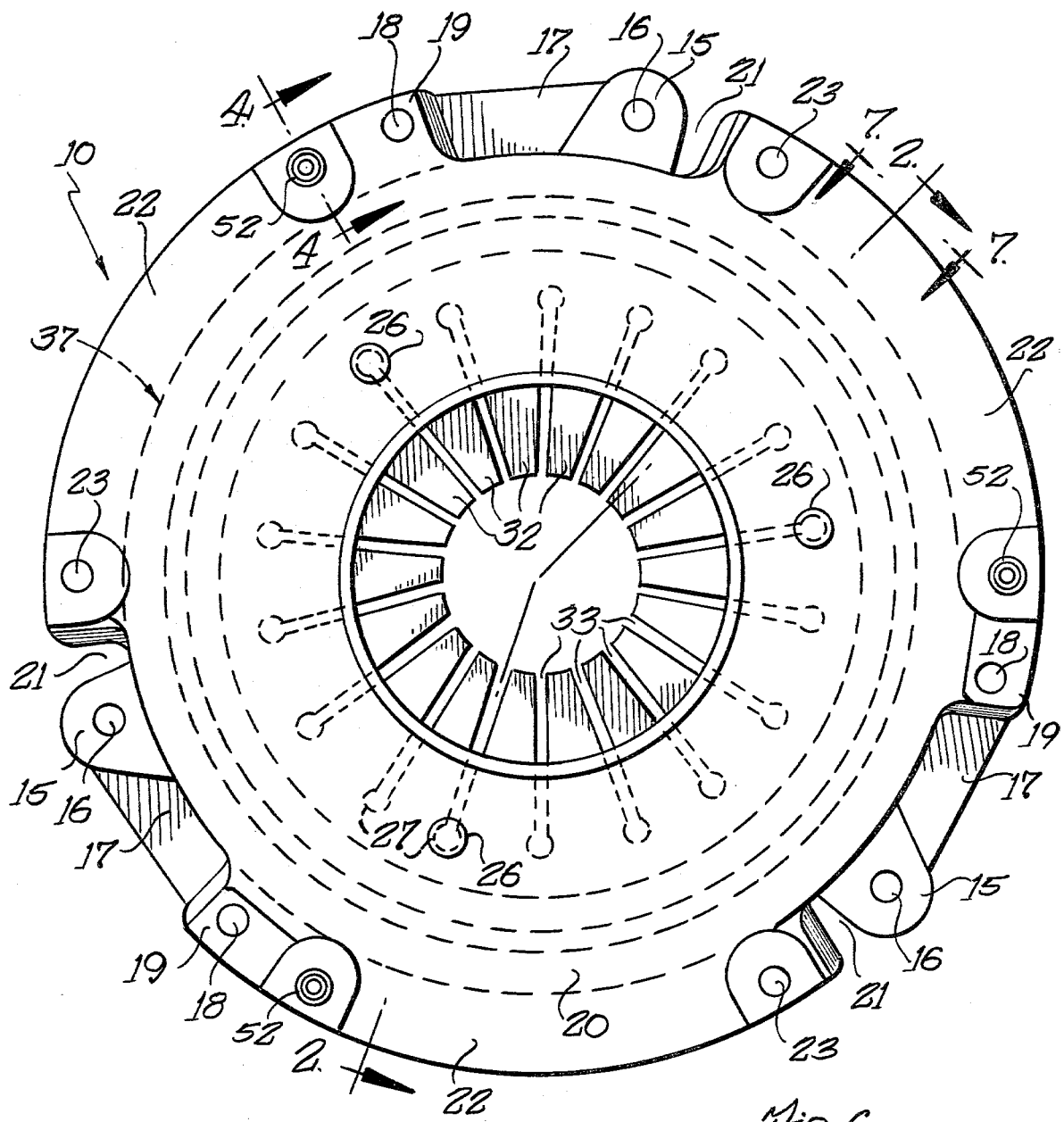
FIG. 1 is a rear elevational view of a clutch pressure plate assembly, with the flywheel, clutch disc and driven shaft omitted, incorporating the wear compensator of the present invention.
Figures 2, 7, 8, 9:
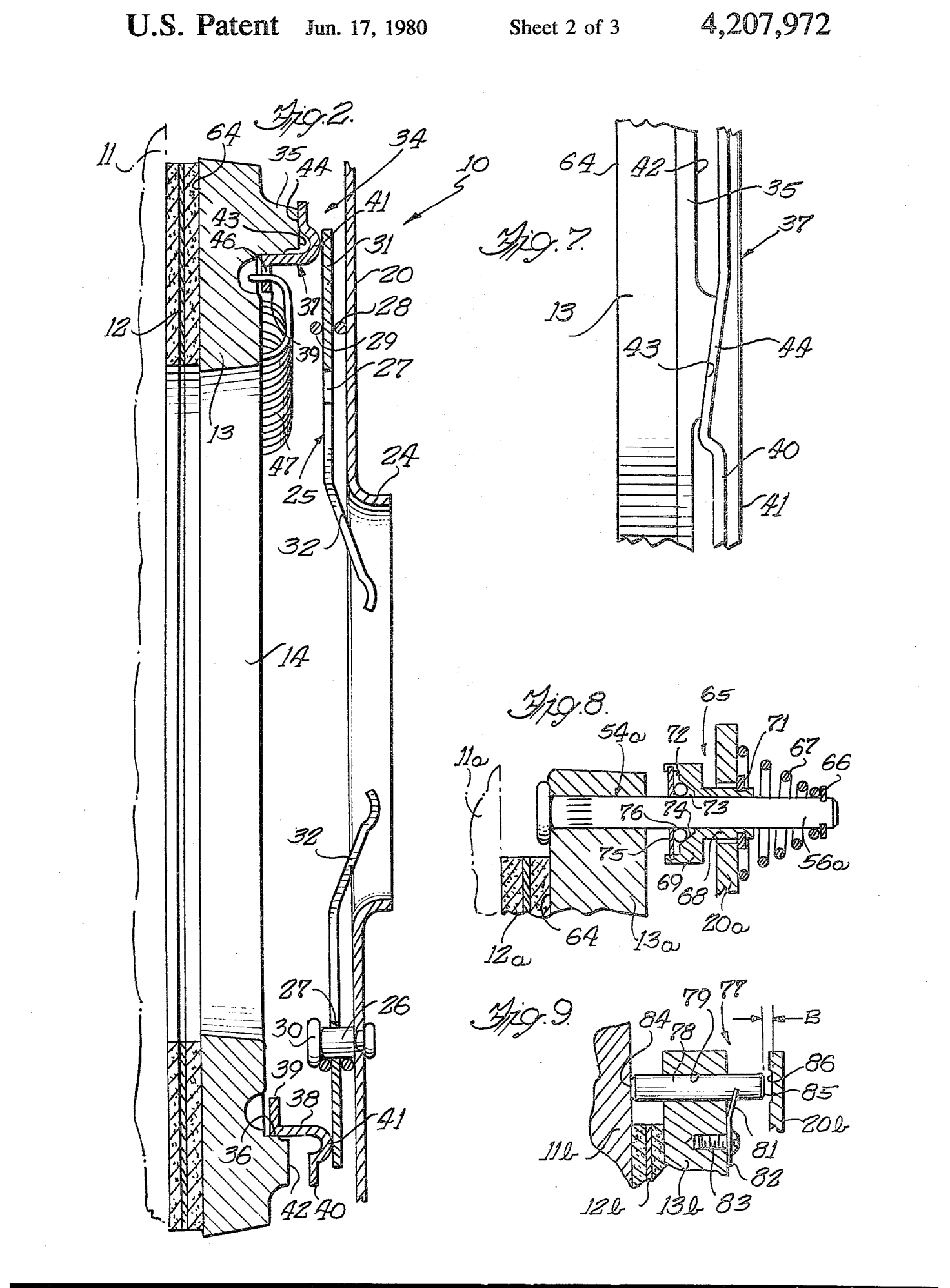
Figure 3:
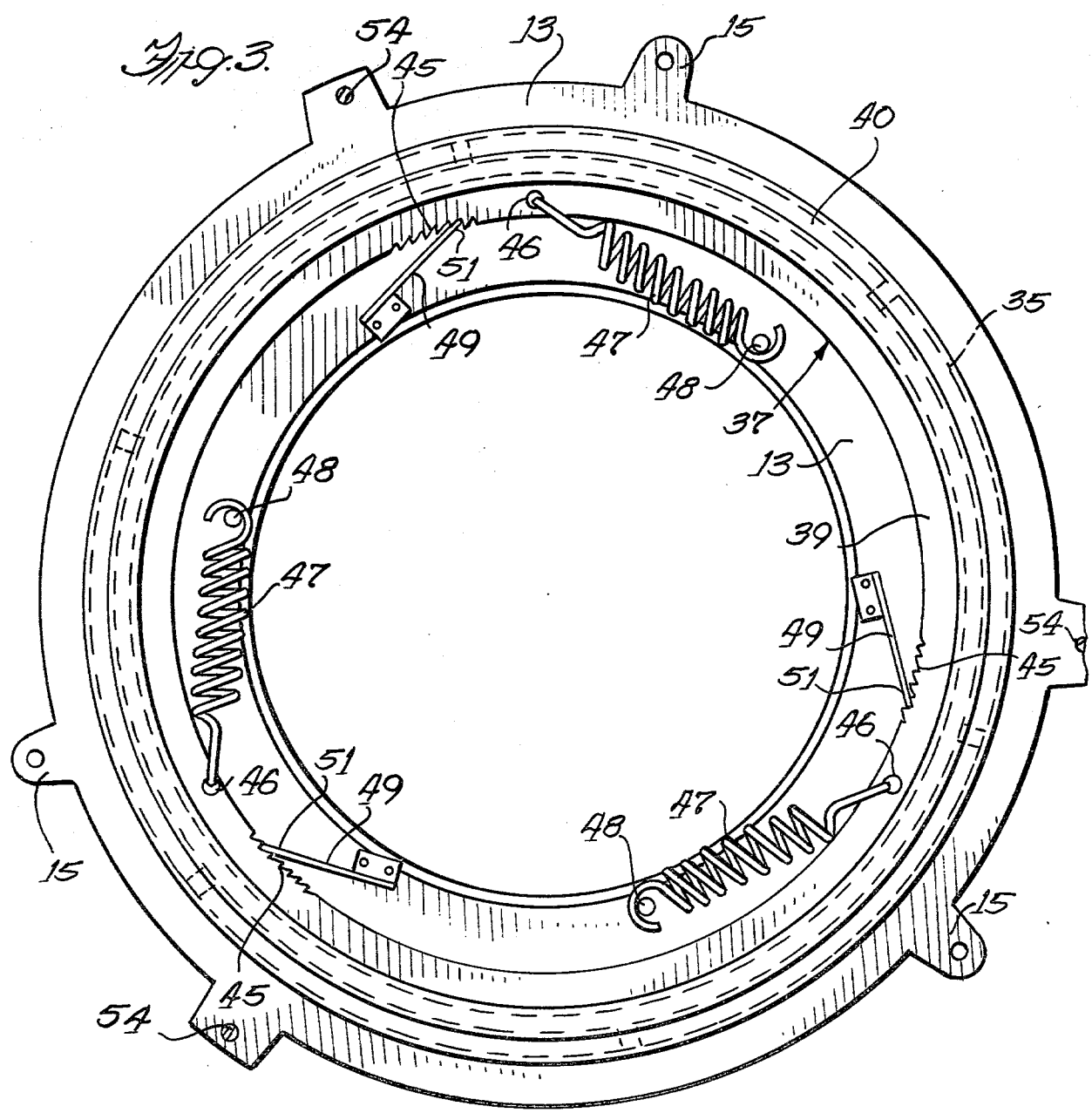
FIG. 3 is a rear elevational view of the pressure plate assembly with the cover plate and diaphragm spring omitted.

Referring more particularly to the disclosure in the drawings wherein are shown illustrative embodiments of the present invention, FIGS. 1, 2 and 3 disclose a clutch pressure plate assembly 10 adapted for use with a flywheel 11 secured to a driving shaft and a clutch disc 12 on a driven shaft (not shown). The pressure plate assembly includes a generally annular pressure plate 13 having a central opening 14 and a plurality of circumferentially spaced drive lugs 15 extending outwardly from the periphery of the pressure plate. Secured to each lug 15 by a rivet 16 is one end of a drive strap 17, the opposite end of each strap being secured by a rivet 18 to an ear 19 formed in a clutch cover 20 substantially encompassing the pressure plate 13; the cover having openings 21 to receive the lugs and drive straps. The cover includes a discontinuous peripheral flange 22 having openings 23 for suitably securing means to fasten the cover to the flywheel 11. The cover also has a central opening defined by an annular flange 24 to receive the driven shaft and release bearing (not shown) for the clutch.

A diaphragm or Belleville spring 25 is mounted for pivotal movement in the cover 21 through a plurality of circumferentially spaced rivets 26 extending through suitable openings 27 in the spring 25. A pair of wire hoops 28, 29 are mounted on the rivets 26 on the opposite surfaces of the spring to provide fulcrum surfaces for the spring; the enlarged heads 30 of the rivets 26 supporting the wire hoops and the spring. The spring 25 is of conventional construction with an outer conical portion 31 and a plurality of inwardly extending fingers 32 formed by slots 33 therebetween; the slots terminating in the openings 27 adjacent the conical spring portion.

The pressure plate 13 supports an adjustable wear compensator 34 and has a rearwardly extending circular rib 35 defining an inner generally L-shaped recess 36 to receive and pilot a pivot ring 37 having an annular wall 38 joining a lower base portion 39 and an upper flange 40 having a rounded fulcrum surface 41 formed therein. The rib 35 terminates in a flat surface 42 having a plurality of circumferentially spaced cam surfaces 43 formed thereon (see FIG. 7). The flange 40 of the pivot ring has a plurality of cam surfaces 44 formed therein complementary to and engaging the surfaces 43 of the pressure plate.

The base portion 39 of the pivot ring 37 is provided on its inner periphery with several sets of serrations or ratchet teeth 45 formed therein and, adjacent each set, an opening 46 is provided for one end of tension spring 47; the opposite end of the spring being secured onto a pin 48 on the pressure plate with the spring normally under tension. A leaf spring or pawl 49 is secured at one end onto the pressure plate with the free end 51 engaging the teeth 45 for a purpose to be later described.

Several circumferentially equally spaced self-adjusting stop means or collars 52 extend through clearance openings 53 in the cover 20 (see FIGS. 4 and 5) and cooperate with a like number of elongated pins 54 having their headed ends 55 secured in the pressure plate 13 and their free ends 56 extending through the collars 52 and clutch cover. Each collar 52 includes a cylindrical body 57 receiving the pin 54 in a slip fit and provided with an enlarged base 58 of a cup-shape with an inwardly extending edge 59 retaining a circular slotted spring 61 in the cup-shaped recess 62. A snap ring 63 is mounted in a groove in the body 57 spaced from the base 58 so as to allow limited movement of the collar relative to the cover 20 in the opening 53. The slotted spring 61 when mounted in the recess 62 of the collar is conical and frictionally engages the pin to act as a one-way clutch.

With the clutch assembled on the flywheel, the pivot ring 37 is positioned relative to the pressure plate rib 35 so that the cam surfaces 43 and 44 are matched in a de-adjusted position. The outer conical portion 31 of the diaphragm spring engages and is biased against the fulcrum surface 41, as seen in FIG. 2, with the resilient force of spring 25 preventing rotation of the pivot ring under the impetus of the springs 47.

Figure 4:
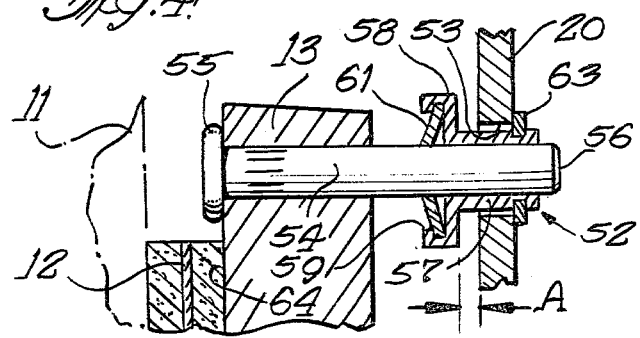
FIG. 4 is a cross sectional view of one embodiment of self-adjusting stop taken on the line 4—4 of FIG. 1.
Figure 6:
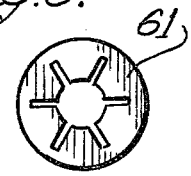
FIG. 6 is a top plan view of the circular slotted spring for the self-adjusting stop.
Figure 5:
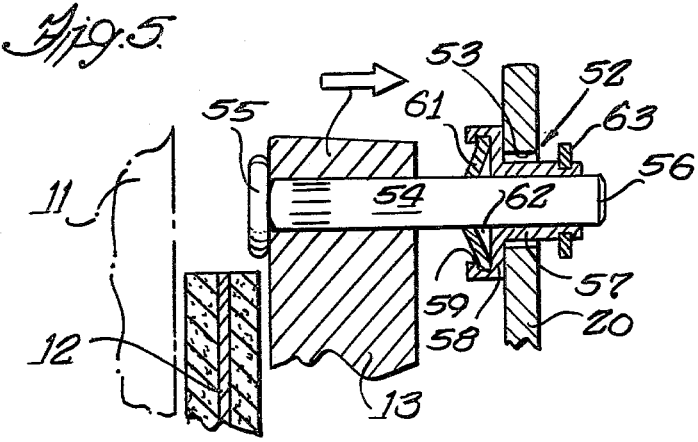
FIG. 5 is a cross sectional view similar to FIG. 4, but showing the stop in the position where the pressure plate is retracted.

With the pressure plate 11 fully engaging the clutch disc 12, the diaphragm spring 25 is in the position shown in FIG. 2 with the pins 54 and stop collars 52 in the position shown in FIG. 4. The clearance space A between the base 58 of each collar and the axially stationary clutch cover 20 defines the extent of movement of the pressure plate to fully disengage the clutch disc 12. To disengage the clutch, a release bearing (not shown) moves to the left to engage the spring fingers 32 to pivot the spring 25 about the wire hoop 29 and release the pressure plate 13; the drive straps 17 acting to retract the pressure plate and move the pins and collars to the right over the distance A. When the release bearing is retracted, the diaphragm spring 25 pivots about the wire ring 28 to bias the fulcrum surface 41 of the pivot ring 37 and the pressure plate 13 toward the clutch disc 12 and flywheel 11; the pins and collars moving in unison with the pressure plate. During normal conditions of disengagement and re-engagement of the clutch, the relative positions of the pins 54 and the collars 52 remain constant.

As facing wear of the clutch disc 12 occurs, the pressure plate moves closer to the flywheel but the collars 52 being restrained by the cover allow the pins 54 to slip relative thereto. Then, upon release of the clutch, the drive straps 17 acting as retractor springs move the pressure plate, pins and collars to the right taking up the clearance A with the collar stopping against the cover. As the operator depresses the pedal the usual distance, a slight overtravel occurs where the periphery of the diaphragm spring 25 is disengaged from the fulcrum surface of the pivot ring 37 causing a clearance equal to the wear occurring. This clearance occurs because the spring movement at this point is slightly greater than the pressure plate movement which is limited by the collars. At this instant, the pivot ring 37 being relieved of all axial loading by the spring 25 is urged clockwise as seen in FIGS. 1 and 3 relative to the pressure plate 13 by the tension springs 47. In view of the cooperation of the cam surfaces 43 and 44, the pivot ring advances up the cam surfaces 43 on the pressure plate to take up the clearance relative to the diaphragm spring, thus completing an adjustment. A new pressure plate friction surface 64 to fulcrum surface 41 dimension has therefore been established. The leaf springs or pawls 49 engaging the teeth 45 on the pivot ring 37 act to prevent counter-rotation of the ring once the new adjusted position has been established. The movement of the pressure plate toward the flywheel not being limited by the collars will again provide a full engagement of the clutch disc, and the pivot ring remains in its new adjusted position until further clutch facing wear occurs, when a further adjustment takes places.

FIG. 8 discloses an alternate embodiment of the self-adjusting stop collar with parts identical to those of FIGS. 1-7 having the same reference numeral with the addition of a script a. The clutch pressure plate 13a engaging the clutch disc 12a has an elongated pin 54a which is secured in the pressure plate and extends through the stop collar 65 and the clutch cover 20a to terminate in a groove receiving a snap ring 66. A conical compression spring 67 encompasses the free end 56a of the pin and bears against the cover 20a and the snap ring 66. The stop collar 65 includes a cylindrical body 68 having an enlarged base 69 and a snap ring 71 spaced therefrom and received in a groove adjacent the opposite end of the body. The base is counterbored at 72 with a smaller recess 73 formed with a conical wedging surface 74. A light diaphragm spring 75 is secured in a groove in the counterbore 72 and acts to bias a plurality of balls 76 against the pins 54a and the conical surface 74 to act as a one-way clutch. This stop collar arrangement operates in the same manner as the stop collars 52 of FIGS. 4 and 5, with the addition of the conical spring 67 to supplement the retractive effort of the drive straps, if needed.

FIG. 9 discloses a third embodiment of self-adjuster with identical parts having the same reference numeral with the addition of a script b. This adjuster 77 utilizes three plain pins 78 of equal length slidable in one direction in openings 79 in the pressure plate 13b and prevented from doing so in the opposite direction by V-notched leaf springs 81 engaging the pins; the base 82 of each leaf spring being secured to the pressure plate by a screw 83. One end 84 of each pin 78 engages the flywheel 11b when the pressure plate 13b engages the clutch disc 12b and the opposite end 85 is spaced from a coined surface 86 in the raised flange of the cover 20b by a distance B.

As seen in FIG. 9, the pins 78 are frictionally positioned in the openings 79 in the pressure plate and are allowed to only slide to the right due to the V-notched leaf spring 81 bearing against one side of each pin. With the pressure plate 13b and flywheel 11b in engagement with the clutch disc 12b, the ends 84 of the pins 78 contact the surface of the flywheel and, upon disengagement of the clutch disc 12b, the pressure plate 13b can move through the distance B before the ends 85 of the pins 78 engage the coined surfaces 86 of the cover 20b. This distance B provides the release clearance to allow complete disengagement of the clutch disc. When the clutch is re-engaged, the parts return to their original positions.

Once the clutch facings begin to wear, the pressure plate 13b moves closer to the flywheel 11b and, as the pins 78 are contacting the flywheel, the pins slide to the right in the openings 79 in the pressure plate as allowed by the V-notched leaf springs 81. Then, upon release of the clutch, the pressure plate is retracted by the drive straps acting as retractor springs, with the pins 78 moving simultaneously therewith to engage the coined surfaces 86 and limit retraction of the pressure plate. Depression of the clutch pedal allows a slight overtravel of the diaphragm spring so that the spring periphery is disengaged from the fulcrum surface of the pivot ring to provide a clearance. The momentarily released pivot ring is urged to rotate by the tension springs (see FIG. 3) to take up the clearance and establish a new pressure plate friction surface to fulcrum surface dimension.

In order that the teeth 45 be sufficiently large to permit shearing with a die, the three or more leaf springs 49 may be spaced unequally around the pressure plate so that only one spring acts at a time, thus giving the equivalent of teeth of three or four times finer pitch. The cam surfaces may have a rise of 1 in 10 so that with a total lining wear of 0.080 inches, the pivot ring 37 would be rotated 0.800 inches with respect to the pressure plate. The springs 47 can probably be of a light load just sufficient to rotate the pivot ring. If three springs 47 exert a total force of 3 pounds and if a 1 in 10 cam slope is used, the resultant axial force of 30 pounds less friction may overcome the force of the drive straps holding the pressure plate released against the stop resulting in the plate moving forward into engagement with the driven member and causing excess rotation of the pivot ring. To prevent this from happening, the drive straps may need to exert more retractive force or auxiliary springs, such as the conical springs 67 shown in FIG. 8, may be necessary.

I claim:

1. A wear compensator for use in a spring-actuated clutch assembly including a friction clutch disc adapted for engagement by a pressure plate and subject to wear during use, a cover member including flanged mounting portions to provide attachment to a driving member surface, a pressure plate having a friction surface, and spring means pivotally mounted in said cover and adapted to urge the pressure plate into engagement with the clutch disc, the wear compensator comprising a pivot ring in operative engagement with the pressure plate and defining a fulcrum surface cooperating with said spring means, said pressure plate having means receiving said pivot ring, camming means between said pressure plate and said pivot ring to alter the distance between the pressure plate friction surface and the fulcrum surface upon relative rotation therebetween, and a plurality of self-adjusting stop means acting between said pressure plate and said cover member to limit the retractive movement of said pressure plate during a clutch release cycle to a predetermined amount regardless of clutch disc lining wear.

2. A wear compensator as set forth in claim 1, in which said spring means comprises a diaphragm spring having an annular outer portion which exerts force on said fulcrum surface.

3. A wear compensator as set forth in claim 2, in which said pivot ring includes biasing means to cause rotation of the ring in one direction and one-way clutch means to prevent rotation in the opposite direction.

4. A wear compensator as set forth in claim 3, in which said one-way clutch means comprises serrations formed in said pivot ring engaged by one or more pawls mounted on said pressure plate, and said biasing means comprises one or more springs acting between said pressure plate and said pivot ring.

5. A wear compensator as set forth in claim 1, in which said camming means includes complementary engaging cam surfaces on said pressure plate and pivot ring, so that rotation of said pivot ring moves the ring axially away from the pressure plate.

6. A wear compensator as set forth in claim 1, in which said self-adjusting stop means includes a plurality of pins slidable in said pressure plate, and a one-way clutch means engaging each pin.

7. A wear compensator as set forth in claim 6, in which said one-way clutch means comprises a V-notched leaf spring secured to said pressure plate and bearing against said pin.

8. A wear compensator as set forth in claim 1, in which said self-adjusting stop means includes a plurality of pins secured in said pressure plate, and a plurality of stop collars mounted in said cover member.

9. A wear compensator as set forth in claim 8, in which said cover member has clearance openings receiving said stop collars, said pins slidably received in and projecting through and beyond said collars and cover member, and one-way clutch means in each collar engaging the corresponding pin.

10. A wear compensator as set forth in claim 9, in which said collars are mounted for limited axial movement in said cover member to limit retractive motion of said pressure plate.

11. A wear compensator as set forth in claim 9, in which said one-way clutch means comprises a slotted conical spring in said collar and positioned to engage said pin to permit axial movement thereof in one direction only.

12. A wear compensator as set forth in claim 9, in which said one-way clutch means comprises a circular spring received in said collar, said collar having a recess defining a conical wedging surface, and a plurality of balls biased by said circular spring to engage said pin and wedging surface.

13. A wear compensator as set forth in claim 9, in which each pin projects beyond said cover member and terminates in a snap ring, and spring means encompassing said pin and abutting said cover member and said snap ring to urge said pin in a retractive direction.

14. A wear compensator as set forth in claim 3, in which, upon clutch wear, said diaphragm spring outer portion overtravels the movement of the pressure plate when the clutch is released by the operator resulting in a clearance between the diaphragm spring outer portion and the fulcrum surface which allows the spring biasing means to rotate said pivot ring, thus compensating for wear.

15. A wear compensator as set forth in claim 1, in which said pivot ring includes a base portion with one or more serrated areas thereon, an annular portion and an upper flange having the fulcrum surface formed thereon, said spring means comprising a diaphragm spring engaging the fulcrum surface, said pressure plate having an annular rearwardly extending rib with a plurality of spaced cam surfaces thereon, a plurality of complementary cam surfaces formed in said upper flange to engage the corresponding cam surfaces on said pressure plate rib, one or more springs acting between said pressure plate and the base portion of said pivot ring to urge the pivot ring in one direction of rotation, one or more pawls on said pressure plate to engage each serrated area to prevent counter rotation of said pivot ring, and said self-adjusting stop means acting between said pressure plate and said cover member to limit retraction of said pressure plate to a predetermined amount during the wear life of said clutch disc.

16. A wear compensator as set forth in claim 15, in which said stop means includes a plurality of pins slidable in said pressure plate, and a one-way clutch means for each pin comprising a V-notched leaf spring secured to said pressure plate and bearing against the pin, said cover member having a coined area to be engaged by each pin.

17. A wear compensator as set forth in claim 15, in which said stop means includes a plurality of pins, each secured at one end in said pressure plate, said cover member having clearance openings to receive the opposite free ends of said pins, a plurality of stop collars received in said clearance openings for limited axial movement, each collar including a body portion receiving a pin therethrough, an enlarged base portion and a snap ring spaced from said base portion, and a one-way clutch in said collar to permit movement of said pin therethrough in only one direction.

18. A wear compensator as set forth in claim 17, in which each pin extends beyond said cover member and terminates in a shoulder, and a coil spring encompassing each pin and abutting said cover member and said shoulder to aid in retraction of said pressure plate.

19. A wear compensator as set forth in claim 15, in which said collars act to limit the retractive movement of said pressure plate and, when the clutch disc exhibits wear, the pressure plate and pins move relative to the collars.

20. A wear compensator as set forth in claim 15, in which said one-way clutch comprises a slotted circular spring received in the base portion of each collar, the inner slotted periphery of each circular spring yieldably engaging a corresponding pin.

21. A wear compensator as set forth in claim 15, in which said one-way clutch comprises a circular spring in the base portion of each collar, said collar having a recess defining a conical wedging surface, a plurality of balls received in said recess and biased by said circular spring into clutching engagement with its respective pin and wedging surface.

* * * * *